United States Patent [19]
Petersen

[11] 3,946,473
[45] Mar. 30, 1976

[54] CUTTING TOOLS
[75] Inventor: Daniel R. Petersen, Livonia, Mich.
[73] Assignee: Ex-Cello-O Corporation, Troy, Mich.
[22] Filed: Apr. 15, 1974
[21] Appl. No.: 461,065

[52] U.S. Cl. ................................................ 29/96
[51] Int. Cl.² ........................................ B26D 1/00
[58] Field of Search ...................................... 29/96

[56] References Cited
UNITED STATES PATENTS

| 3,310,859 | 3/1967 | Diemond et al. | 29/96 |
| 3,341,920 | 9/1967 | Kelm | 29/96 |
| 3,488,822 | 1/1970 | Jones | 29/96 |
| 3,540,102 | 11/1970 | Yogus et al. | 29/96 |

Primary Examiner—Leonidas Vlachos

[57] ABSTRACT

This invention is the method and apparatus for locking an indexable replaceable cutting tool insert into a cutting tool holder using a tilting pin type device consisting of a threaded pin with spheroidal surfaces which lock the insert into an insert pocket of any geometrical shape common to industry.

12 Claims, 10 Drawing Figures

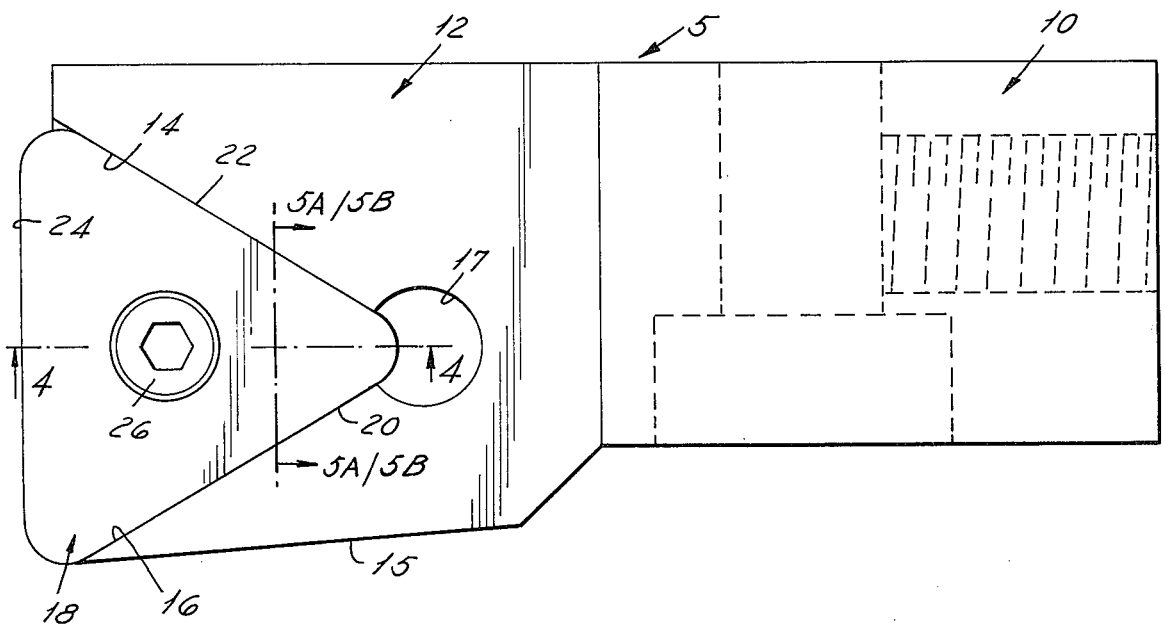
FIG. 1
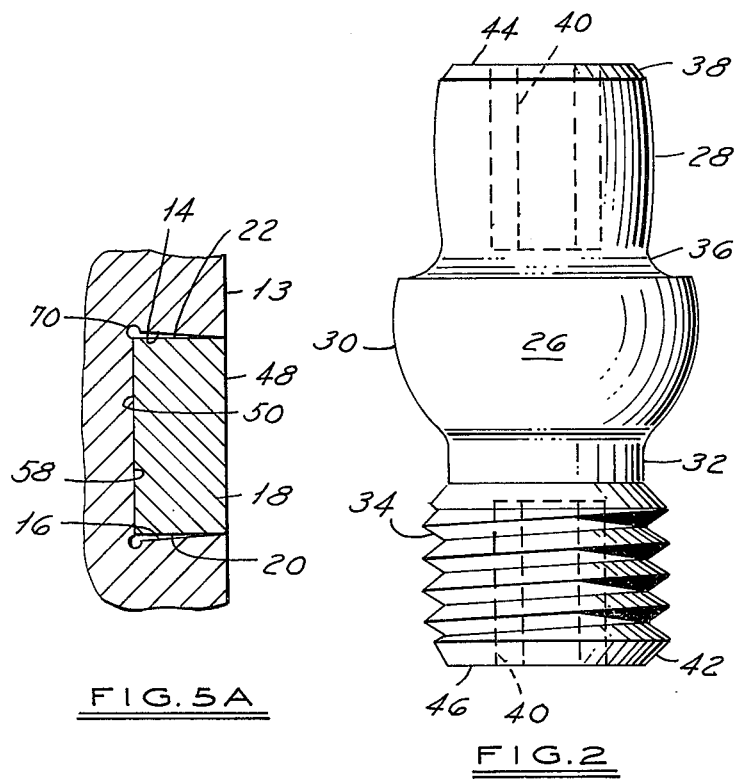
FIG. 5A
FIG. 2

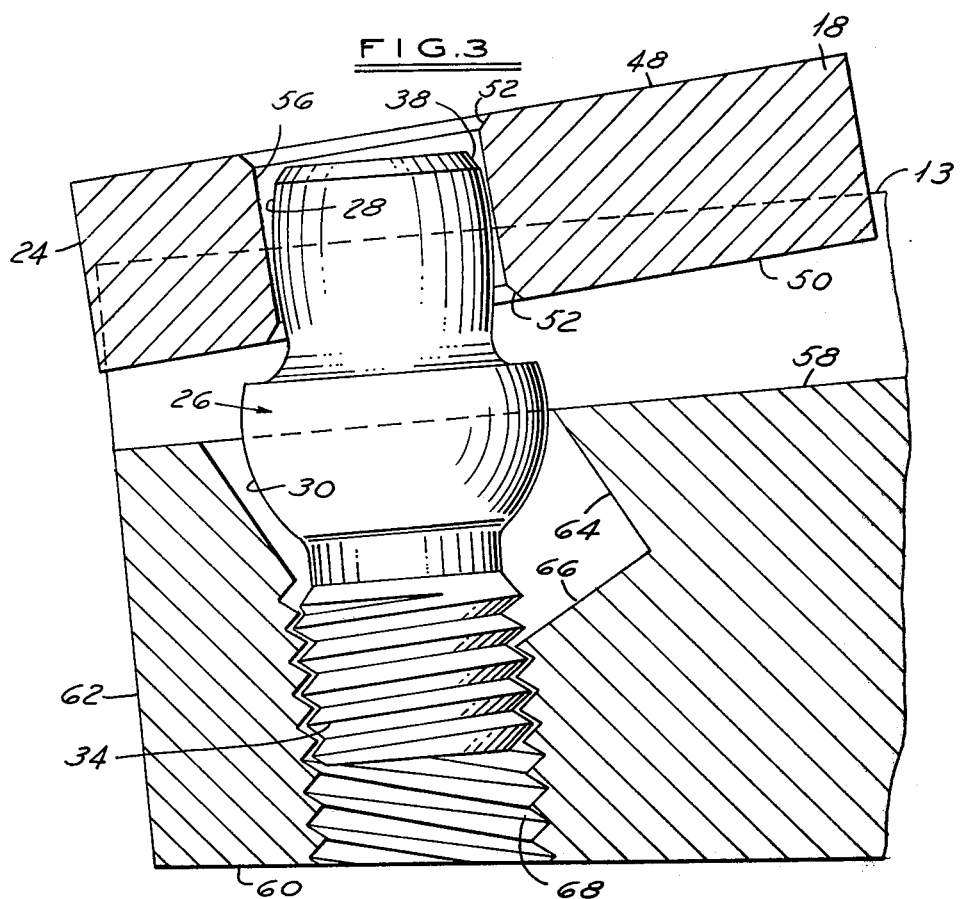
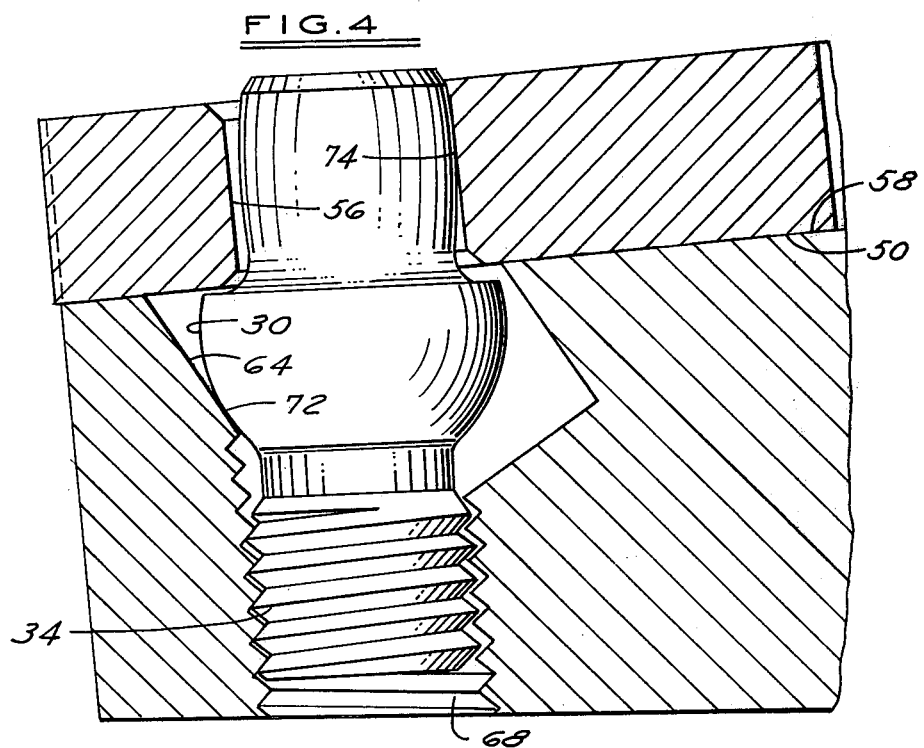

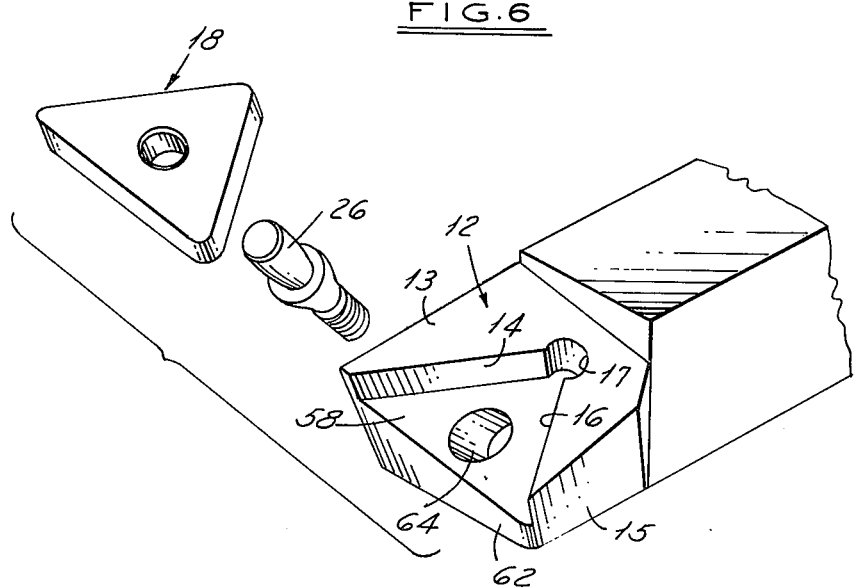
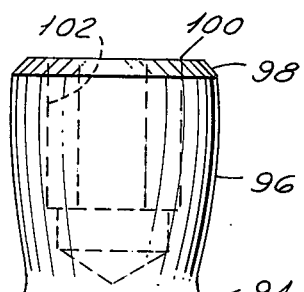
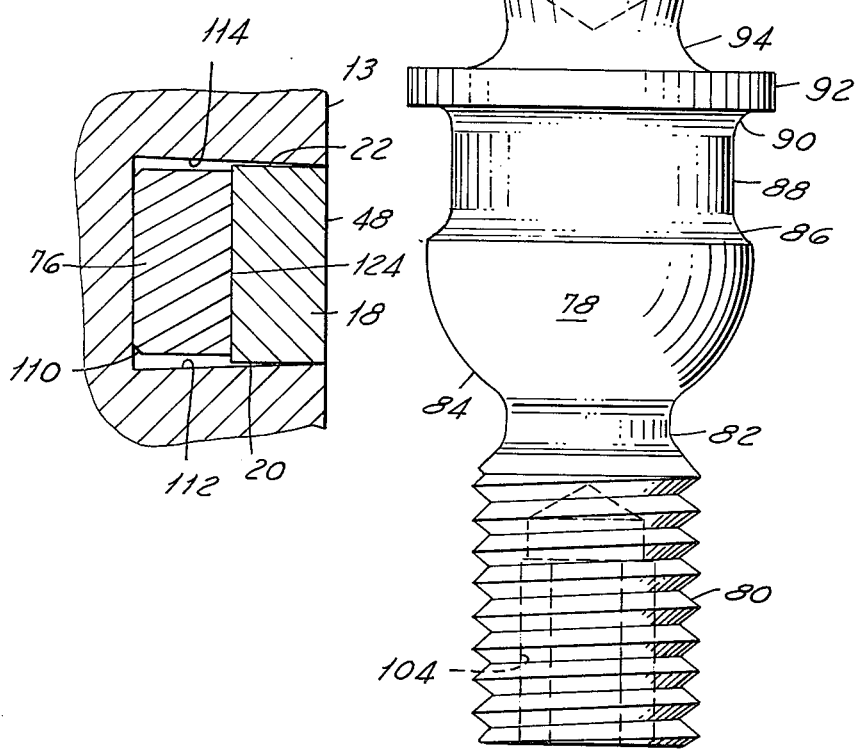

CUTTING TOOLS

BACKGROUND OF THE INVENTION

1. Field of the Invention

This invention relates to the view and disassembling of cutting tool inserts with multiple cutting edges into a cutting tool holder and the method for holding and locking the insert.

2. Description of Prior Art

The use of replaceable inserts in machine tool applications for cutting material in machining operations is well known and recognized in this art. Almost all of these devices are of the quick release and change type mechanism for replacing the cutting tool insert and have anywhere from one to four pieces which make up the complete cutting tool holder. Many different devices for holding and securing the insert are known in this art. A problem which is solved by this invention is securely clamping the insert into the pocket and introducing a force resistant to the insert tipping up at the rear section of the cutting insert when it comes under the cutting load in a machine tool operation. Also, the invention uses a single locking pin for securing the cutting tool insert in place.

SUMMARY OF THE INVENTION

This invention relates to an indexable insert securing means for replaceable tip cutting tools. Said inserts can be made from hard material such as carbide and this invention presents a novel means for securing and locking said insert into a pocket in the tool holder. The pocket sides coact with the insert when it is tightened into place by an angular tilting action of a threaded pin with spheroidal surfaces that secure and lock the insert into the tool holder.

A principal object of this invention is to provide a means for securely locking an indexable cutting tip in a tool holder pocket and includes a simple and quick mechanism for changing the tip.

A further object is to allow the indexing of this tip as it becomes worn from use.

Another object is to provide a means for releasing the cutting tool tip from either one of two directions for ease of replacement or indexing, specifically from the top or bottom of said tool holder.

Another object is to provide a spacing shim for support of the cutting tip which allows minimal loosening of the locking mechanism for release of the cutting tip.

Another object is to provide an insert pocket in a tool holder which with the tilting lock pin will keep the cutting insert from rising up out of the seat when the insert is tightened into place and also during the stress of a cutting operation.

Still another object is to provide an inexpensive and low cost alternative to present methods of holding cutting tips.

Other objects of this invention will become apparent and will be best understood when taken in view of the accompanying drawing supplied herein.

BRIEF DESCRIPTION OF THE DRAWING

FIG. 1 is a plan view of a cutting tool showing the relative location of the tool holder, cutting tip and locking pin.

FIG. 2 is a side view of a locking pin.

FIG. 3 is a sectional view of the structure in FIG. 1 similar to FIG. 4 but in a partially assembled position.

FIG. 4 is a sectional view of the structure in FIG. 1 along 4—4 in a locked position.

FIG. 5A is a sectional view of the structure in FIG. 1 along 5—5 in a locked position.

FIG. 5B is a sectional view similar to FIG. 5A but illustrating the structure shown in FIG. 8 having a cutting tip insert and a shim member in a locked position.

FIG. 6 is an exploded view of the embodiment in pictorial form.

FIG. 7 is a side view of a locking pin used with a shim.

DESCRIPTION OF THE INVENTION

Figure 8:
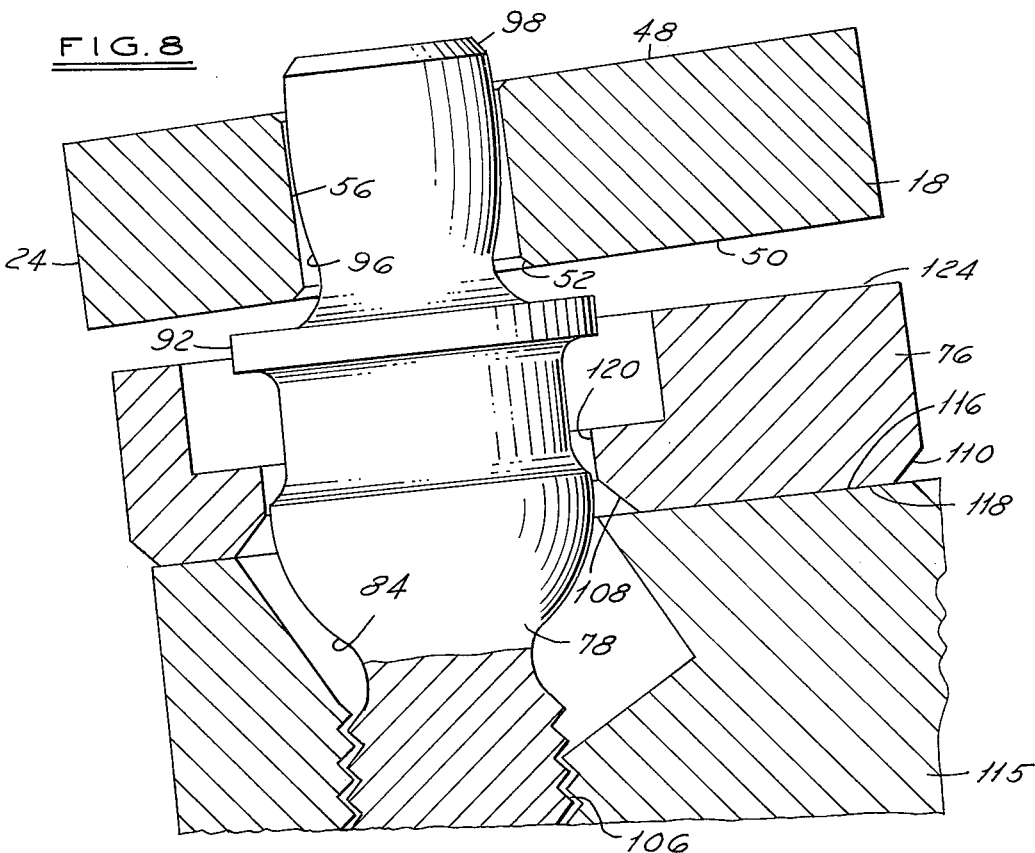
FIG. 8 is a sectional veiw of an alternate embodiment using the locking pin shown in FIG. 7 and similar to FIG. 3.

Referring now to the drawings, and partially to FIG. 1 through FIG. 6, therein is a cutting tool holder, referred to by numeral 5, consisting of a shank 10 generally rectangular in cross section with provisions for attaching to a tool post of a conventional metal cutting machine such as a lathe. The shank 10 is integrally connected to the head 12 which forms the whole of the tool holder 5 with the head 12 having a tapered trapeziform section which is larger at the bottom 60 front than the shank 10 section and whose topmost surface 13 is tipped down at a compound angle toward front surface 62 and toward side surface 15 with a pocket consisting of botton surface 58 as the seat and surfaces 14 and 16. The pocket back wall is almost perpendicular to the bottom surface 58 of the pocket which holds an insert 18. The shape of the pocket consisting of surfaces 58, 14 and 16 is similar to insert 18 with the surfaces 14 and 16 having a 90° maximum to a slightly less than 90° angle to bottom surface 58 at undercut 70 shown in FIG. 5A. A clearance hole 17 perpendicular to bottom surface 58 provides for clearance of the insert's 18 tip.

A cylindrical hole 64 in FIG. 4 with its axis inclined to the pocket surface 58 is accurately disposed in the head section 12 with a threaded hole 68 perpendicular to pocket surface 58 connecting the bottom surface 66 of the cylindrical hole 64 to bottom surface 60 of head 12.

The insert 18 has a hole 56 substantially at the geometric center of the insert opposed faces, the axis of the hole 56 being substantially perpendicular to the parallel planes of said faces 48 and 50. Said insert 18 (illustrated in FIG. 6) when in use, for example, can have a total of six cutting edges by indexing it three times and turning insert 18 upside down and indexing three more times. Other insert shapes, such as square and pentagonal, can afford still larger number of usable cutting edges.

A tilting lock pin, or a wedge locking pin, 26, shown in FIG. 2, consists of a threaded end 34 which connects to a cylinder 32 and to a spheroidal surface 30 to a fillet 36 which joins the ellipsoidal surface 28 and then to a chamfer 38 to the top of the pin 44. A relief in the top 40 can be a hexagonal socket for insertion of a hexagonal wrench or key or other similar tool for rotating the tilting lock pin 26. It can readily be seen that a similar relief can be disposed on the opposite end of the tilting lock pin 26 for use in insertion of insert 18 and for removal, affording access from top or bottom of said tool holder 5.

The locking of insert 18 into tool holder 5 is shown in FIG. 3 and FIG. 4 and is as follows. The tilting lock pin 26 is threaded loosely into threads 68 and the insert 18 is easily slipped over the ellipsoidal surface 28 which is slightly smaller in diameter than the insert hole 56. The chamfers 52 on the insert 18 in conjuntion with the chamfer 38 on the tilting lock pin 26 allow for ease of insertion and removal of the insert 18.

A rotation of the tilting lock pin 26 while in contact with the threaded hole 68 brings the spheroidal surface 30 in contact with the inclined cylindrical hole 64, best viewed in FIG. 3 and FIG. 4, and with the insert 18 sitting on the surface 58 of the pocket. The ellipsoidal surface 28 of the tilting lock pin 26 will make contact with the insert hole 56 exerting forces in such a way so as to bring faces 20 and 22, respectively, of the insert 18 in contact with side surfaces 14 and 16 of the pocket. Further tightening of the tilting lock pin 26 will cause the looseness between the threaded portion 34 and the threaded hole 68 to be reduced as the spheroidal surface 30 contacts the inclined cylindrical hole 64. This causes the spheroidal surfaces 30 to slide on the hole 64 until all slack is gone and causes the vertical axis of the tilting lock pin 26 to skew toward clearance hole 17 in the head 12. The contact at 72 between spheroid 30 and hole 64 acts as a pivot point causing the ellipsoidal surface 28 to make contact 74 with insert hole 56 exerting locking forces between the insert rear surfaces 20 and 22 and the pocket back wall 16 and 14, respectively. Conversely, initial rotation in reverse positively displaces, angularly, the tilting lock pin 26 to skew away from contact with the insert hole 56 and allows easy and rapid removal of the insert 18 for its indexing or replacement. Namely, surface 28 moves away from contact 74 with hole 56 and in some applications the edge of fillet 36 will raise insert 18 off surface 58.

FIG. 5A is a sectional view illustrating the contact action between pocket back walls 14 and 16 and the insert 18. This is slightly exaggerated to show the clamping action of the intersection of top surface 13 and pocket back walls 14 and 16 which hold the insert 18 at or near the top surface 48. This clamping action is the result of the secure contact with the back walls 14 and 16 of the pocket which keeps the insert 18 firmly seated on pocket surface 58 when the tool holder 10 and insert 18 are in an actual machining operation.

Contact between a work piece and the intersection of top surface 48 of insert 18 and front face 24 of the insert 18 will cause a force at this intersection which would cause faces 20 and 22 of the insert 18 to try to rise out of the pocket but is prevented from doing so because of the aforementioned clamping action.

The clamping action of surfaces 14 and 22 and surfaces 16 and 20 also prevents the insert 18 from rising up out of the pocket when it is tightened into place by the tilting lock pin 26 upon original installation on the insert 18 or when the insert 18 is indexed to expose a new cutting surface edge such as the intersection of top surface 48 with faces 20 or 22 to a work piece.

Referring now to FIG. 1, FIG. 5B, and FIG. 7 through FIG. 9, these illustrate another method of holding the insert 18 by using a shim 76 and a captive tilting lock pin 78. The captive tilting lock pin 78 consists of a threaded end 80 which connects to a cylinder 82 which connects to a spheroidal surface 84 which connects to a fillet 86 which connects to cylinder 88 which connects to a fillet 90 which connects to a flange 92 which connects to a fillet 94 which connects tapered a taperedd ellipsoidal surface 96 which connects to a chamfer 98 forming top 100 for the pin 78. The reliefs 102 and 104 in the tilting lock pin 78 can be hexagonal sockets for insertion of a hexagonal wrench or key or other similar tool for rotating the tilting lock pin 78 when its threaded end 80 is in contact with the threads 106 of head 115.

The shim 76 in conjunction with the pocket of the head 115 supports the insert 18 during its use in the tool. This shim 76 is captive in the pocket by flange 92 of the captive tilting lock pin 78 which not only supports the insert 18 but is slightly smaller than insert 18. The shim 76 has a chamfer 110 on the bottom which eliminates any necessity for an undercut 70 in pocket as shown in FIG. 5A. The clamping action of the sides of the pocket of surfaces 112 and 114 are similar to those described above which prevents the insert 18 from cocking out of the pocket.

Figure 9:
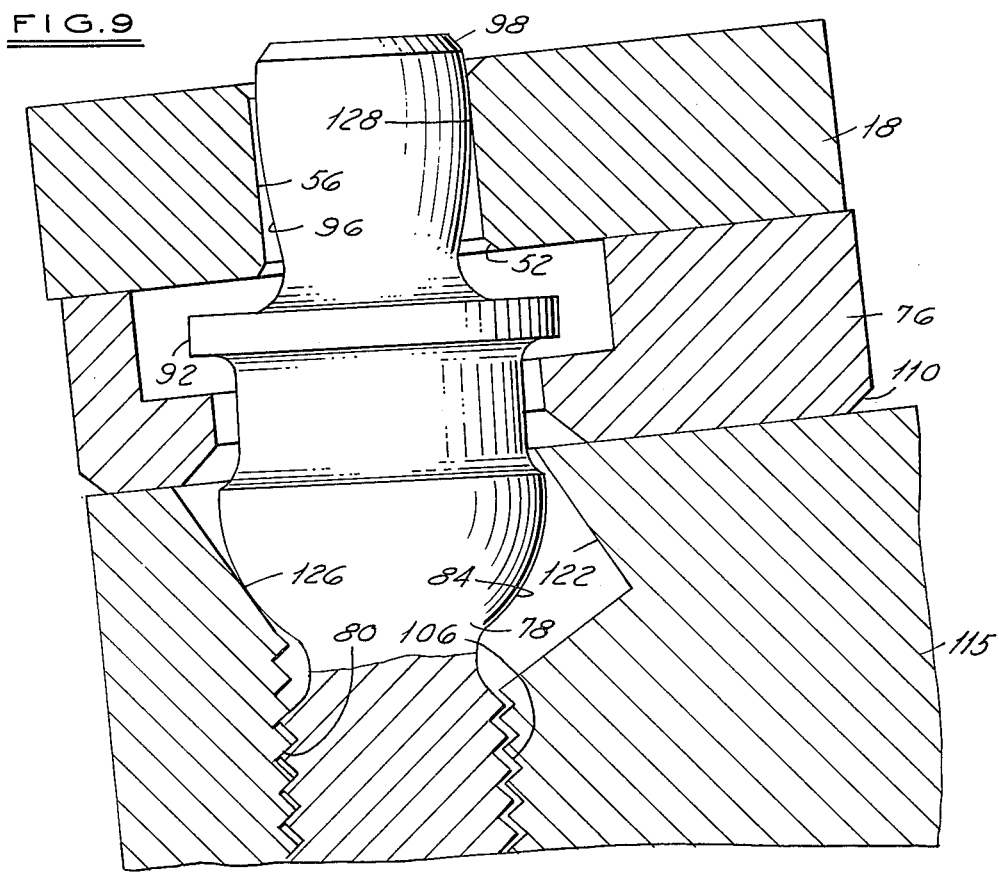
FIG. 9 is a sectional view of the alternate embodiment similar to FIG. 4.

Referring specifically to FIG. 8 and FIG. 9, the shim 76 is first placed onto the bottom 116 of the pocket with the bottom 118 of shim 76 in intimate contact. Bore 120 in shim 76 is large enough to allow the spheroidal surface 84 to clear but too small for flange 92 of captive tilting lock pin 78, hence keeping the shim 76 captive in pocket of head 115. With the shim 74 in place and captive tilting lock pin 78 threaded loosely in thread portion of head 106, insert 18 is slipped over the tapered ellipsoidal surface 96 which is slightly smaller in diameter than the insert hole 56. The lead chamfer 52 on the insert 18 in conjunction with the chamfer 98 on the captive tilting lock pin 78 allows for ease of insertion and removal.

The rotation of the captive tilting lock pin 78 with its threaded end 80 in contact with the threads 106 brings the spheroidal surface 84 in contact with the inclined cylindrical hole 122 and with the insert 18 sitting on the top 124 of shim 76 which is sitting on the surface 116 of the pocket. The tapered ellipsoidal surface 96 of the captive tilting lock pin 78 will contact the insert hole 56 exerting forces in such a direction so as to bring surfaces 112 and 114 (see FIG. 5B) of the pocket in contact with faces 20 and 22, respectively, of the insert 18. Further tightening of the captive tilting lock pin 78 will cause the looseness between the threaded portion 80 and the threaded hole 106 to be reduced as the spheroidal surface 84 contacts the inclined cylindrical hole 122 causing the spheroidal surface 84 to slide on hole 122 until all slack is gone and also causing the vertical axis of the captive tilting lock pin 78 to skew toward clearance hole 17 in the head 115. With all the slack gone, a contact location 126 between spheroid 84 and hole 122 will act as a pivot point causing the tapered ellipsoidal surface to make a contact location 128 with insert hole 56 which now exerts locking forces between insert faces 20 and 22 and the pocket surfaces 112 and 114, respectively.

FIG. 5B shows a sectional view of this contact action with the pocket surfaces 112 and 114 slightly exaggerated to show clamping action of the intersection of the top surface 13 and the pocket surfaces 112 and 114 which hold the insert 18 at or near the top surface 48. This clamping action as described is the result of the surfaces 112 and 114 of the pocket which keeps the insert 18 firmly seated on the shim top surface 124 when the tool holder 5 and insert 18 are in an actual machining operation.

Contact between a work piece and the intersection of top surface 48 of insert 18 and face 24 of insert 18 will cause a force at this intersection which would cause the faces 20 and 22 of the insert 18 to try to rise out of the pocket but is prevented from doing so because of the aforementioned clamping action.

The clamping action of surfaces 114 and 22 and surfaces 112 and 20 also prevents the insert 18 from rising up out of the pocket when it is tightened in place by the captive tilting lock pin 78 upon original installation of the insert 18. This also occurs when the insert 18 is indexed to expose a new cutting surface edge such as the intersections of faces 20 or 22 with the top surface 48 to the work piece.

The hexagonal sockets 102 and 104 in the captive tilting lock pin 78 allow for clamping or unclamping of the insert 18 from top or bottom of the tool holder with the hexagonal wrench which may eliminate the necessity of removing the tool holder from the machine tool post to which it is affixed.

An essential feature of the invention is the contact locking facility that automatically adjusts by the rotational movement of the pin to form a clamping force, when tightened, between the inclined hole and spheroidal surface of the pin that is transmitted through the pin via the ellipsoidal surface to the hole of the insert (which by nature of the shape is forced into the pocket) by the pivot and sliding action of the pin causing the clamping result. It should also be noted that, because of this design, the system is self-adjusting and automatically compensates for any wear that occurs to the various contact surfaces. Another advantageous feature of the present invention is the captive shim which reduces the need for an undercut of the pocket that allows the insert to seat flat in the pocket and also for ease of indexing or changing the insert since a short turn of the pin will release the insert but will hold the shim in place which reduces insert change time and effort.

While preferred embodiments of the invention have been illustrated and described, it will be understood that various changes and modifications may be made without parting from the spirit of the invention.

What I claim as new and desire to secure by Letters Patent of the U.S. is:

1. In a cutting tool
   a. a disposable cutting insert having a hole substantially at the geometric center;
   b. a body providing a flat bottom and at least one side which forms a support means against which said insert rests;
   c. an inclined hole with the axis of inclination toward the front of the tool intersecting with a threaded hole substantially perpendicular to the bottom of the support means; and
   d. a pin fitting within the inclined hole in the body with an end projecting into the hole of the insert, said pin having a spheroid portion which coacts with said inclined hole when tightened in said threads forming a tilting lock by point contact between spheroid portion of pin, inclined hole in holder, and hole in insert securing it in place.

2. In a cutting tool
   a. a disposable cutting insert having a hole substantially at the geometric center;
   b. a body providing a flat bottom and at least two sides converging which form a pocket against which said insert rests;
   c. a hole inclined with axis of inclination toward the front of the tool and with a threaded section substantially perpendicular to the bottom of the pocket; and
   d. a pin fitting within the inclined hole in the body with an end thereof projecting into the hole of the insert, said pin when tightened forming a wedge lock by point contacts between the spheroid portion of pin and inclined hole in holder and the ellipsoidal portion of pin and hole in insert securing it in place against sides of the pocket.

3. The cutting tool of claim 1 in which the side wall of the support means is angled in such a direction so as to produce a line contact with the rear side of the insert when the wedge locking pin is tightened.

4. The cutting tool of claim 2 in which the side walls of the pocket are angled in such a direction so as to produce a line contact with the rear sides of the insert when the wedge locking pin is tightened.

5. In a cutting tool
   a. a disposable cutting insert having a hole substantially at the geometric center;
   b. a shim having a hole substantially at the geometric center and having the same geometric shape as the insert;
   c. a body providing a pocket with a flat bottom and at least one side against which said insert and shim rests;
   d. an inclined hole with the axis of inclination toward the front of the tool intersecting with a threaded hole substantially perpendicular to the bottom of the support means; and
   e. a pin fitting within the inclined hole in the body with an end projecting into the hole of the insert, said pin having a spheroid portion which coacts with said inclined hole when tightened in said threads forming a tilting lock by point contact between spheroid portion of pin, inclined hole in holder, and hole in insert securing it in place.

6. In a cutting tool
   a. a disposable cutting insert having a hole substantially at the geometric center;
   b. a shim having a hole substantially at the geometric center and having the same geometric shape as the insert;
   c. a body providing a pocket with a flat bottom and at least two sides against which said insert rests;
   d. a hole with the axis inclined toward the front of the tool and with a threaded section substantially perpendicular to the bottom of the pocket; and
   e. a pin fitting within the inclined hole in the body with an ellipsodial end thereof projecting into the hole of the shim and insert, said pin having a spheroid portion which coacts with said inclined hole when tightened forming a wedge lock by point contacts between the spheroid portion of pin and inclined hole in the holder, and the ellipsoidal portion of pin and hole in insert securing it in place against sides of pocket.

7. The cutting tool of claim 5 in which the side walls of the pocket are angled in such a direction so as to produce a line contact with rear edges of the insert when the wedge locking pin is tightened.

8. The cutting tool of claim 6 in which the side walls of the pocket are angled in such a direction so as to produce a line contact with rear edges of the insert when the wedge locking pin is tightened.

9. The cutting tool of claim 5 wherein said pin wedge lock means is accessible from the bottom of said tool holder means.

10. The cutting tool of claim 6 wherein said pin wedge lock means is accessible from the bottom of said tool holder means.

11. The cutting tool of claim 7 wherein said pin wedge lock means is accessible from the bottom of said tool holder means.

12. The cutting tool of claim 8 wherein said pin wedge lock means is accessible from the bottom of said tool holder means.

* * * * *